E. ELLS.
TUBE FORMING MACHINE.
No. 13,255. Patented July 17, 1855.
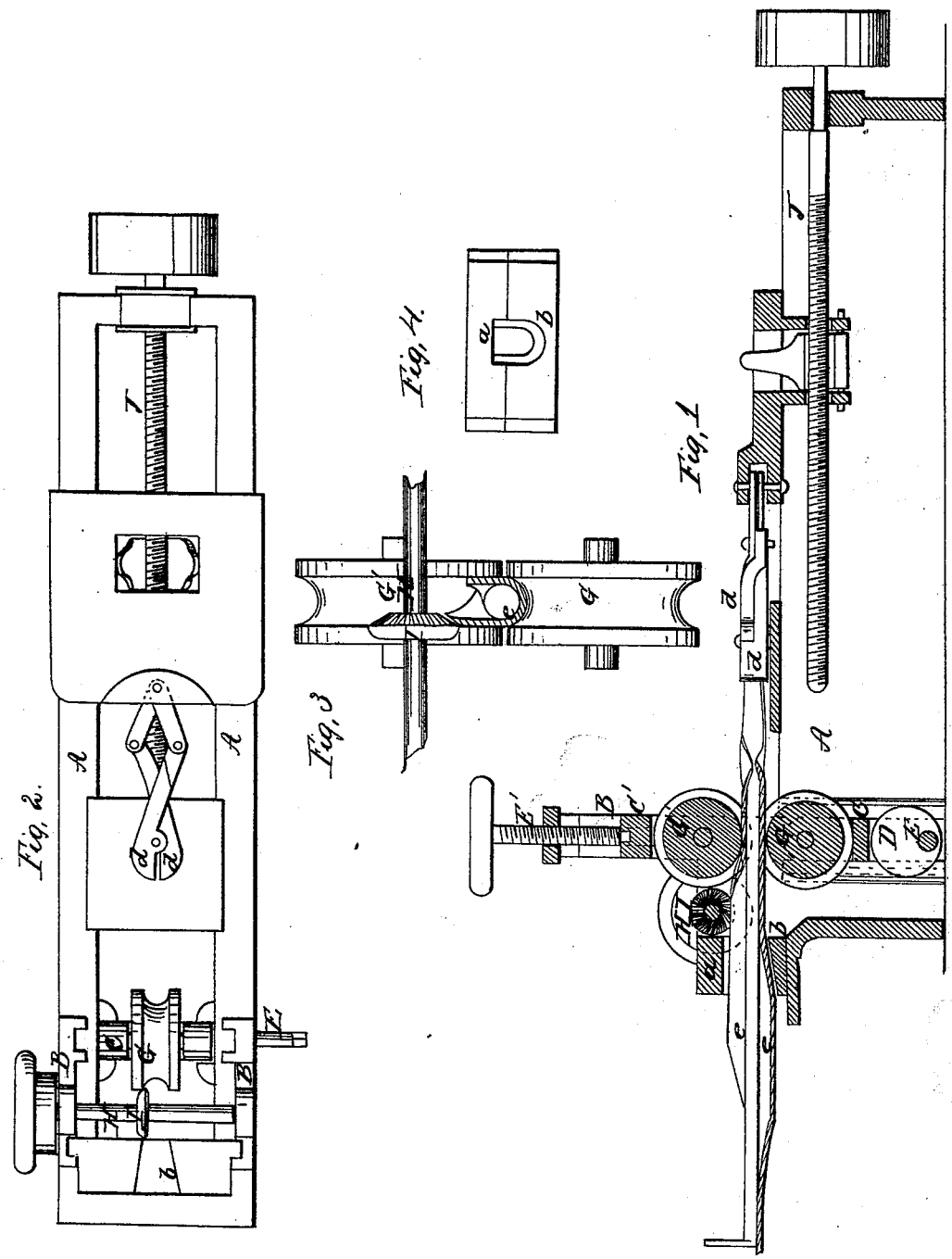

UNITED STATES PATENT OFFICE.

EDWIN ELLS, OF ANSONIA, CONNECTICUT.

MACHINE FOR FORMING METAL TUBES.

Specification of Letters Patent No. 13,255, dated July 17, 1855.

*To all whom it may concern:*

Be it known that I, EDWIN ELLS, of Ansonia, in the county of New Haven and State of Connecticut, have invented a new and useful Improvement in Machinery for Forming Metal Tubes; and I do hereby declare that the following is a full, clear, and exact description of the same, reference being had to the accompanying drawings, forming part of this specification, in which—

Figure 1, is a longitudinal vertical section of a machine embracing all the features of my invention. Fig. 2, a plan of the same, with the upper part of the forming die and upper roller removed. Fig. 3, is a front view of the rollers and the rotary bur by which the lap is scarfed. Fig. 4, is a front view of the forming die.
Similar letters of reference indicate corresponding parts in the several figures.

This invention is intended particularly to be employed in the manufacture of copper tubing and is intended to take a flat strip or skelp of metal and form it into a tube ready for the brazing operation. It may however be employed in the manufacture of tubes of other metal. It consists chiefly in certain arrangements of forming dies and rollers and a scarfing cutter or cutters which enable the tube to be formed at one operation.

To enable those skilled in the art to make and use my invention, I will proceed to describe its construction and operation.

A, is a strong cast iron bed, carrying the whole of the working parts of the machine. At the front end of this bed is a die *a*, *b*, of the form of the letter U, shown in Figs. 1, and 4. This die is made tapering, as shown in Figs. 1 and 2, the largest part being in front. It is composed of two parts *a*, and *b*, which are provided with tongues to fit vertical grooves in two standards B, B, attached to the bed. The duty of this die is to bend the strip or skelp to give its transverse section the form of the letter U, as it is drawn through by a pair of nippers *d*, *d*, which are operated by a screw J, or endless chain in a similar manner to the nippers of the common draw bench. At a short distance behind the U shaped die, *a*, *b*, there is a pair of rollers G, G′, each one of which has a semicircular groove in its periphery corresponding with the intended external form of the tube to be produced. The lower one G, of these rollers has its journals fitted to revolve in bearings in the ends of a cross head C, which is capable of sliding in vertical grooves in the standards B, B, and which is supported by an eccentric D, on a shaft E, which is arranged below. The upper roller G′, has its journals fitted to turn in bearings in the ends of a cross head C′, which slides in grooves like the other cross head C, and which is held down in place by a screw E′, which works in a nut in a third cross head F, at the top of the standards. These rollers are for the purpose of finishing the forming operation which was commenced by the U shaped die. Between the U shaped die and the rollers there is a shaft H, parallel with the roller shafts carrying the rotary bur cutter I, by which the outer edge of the lap is scarfed as it passes from the die to the rollers. The manner in which this scarfing is effected is illustrated in Fig. 3, where as well as in Fig. 1, the strip or skelp is represented with its section tinted yellow and indicated by a letter *e*.

The strip or skelp before being introduced to the machine is cut tapering at the end which is to enter the die, in order that it may pass through far enough to be seized by the nippers *d*, *d*. Before bringing up the nippers, the roller G′, is raised by the screw E′, and the roller G, lowered by turning the shaft E, to throw down the eccentric D. This allows the nippers to be moved close up to the die to take hold of the end of the strip or skelp. The nippers are first drawn back by the application of power to their screw J, or chain, only far enough to allow the roller G, to be raised and the roller G′, to be lowered to their operative positions, and when the rollers are adjusted, all is ready for the operation to commence. The mandrel, upon which the tube is to be formed is now laid upon the strip and entered between the rollers G, G′, and the screw J, or chain is set in motion to draw back the strip or skelp, which in passing through the tapering U shaped die, receives the form of the letter U, the curved bottom part being a semicircle corresponding with the groove of the lower roller G, which is to receive it. The rollers are set in motion by the friction of the metal passing through them and the upper roller draws the two edges of the strip or skelp toward each other flapping one over the other. The bur cutter I, whose shaft H, receives rotary motion either by a band or gearing from one of the rollers or by other means, scarfs the edge which is to make the outer lap, so that the external form of the tube may be as nearly as possible cylindrical. The mandrel moves with the tube and when the whole length of tube has been drawn through, the mandrel is arrested by a proper arrangement for that purpose not requiring description here, and the tube is then drawn off the mandrel by the continued operation of the nippers.

The reason for forming the die *a*, *b*, in two parts is to allow greater convenience in entering the end of the strip or skelp of metal.

I do not claim the employment of rollers alone to give form to the tube neither do I claim bringing the strip or skelp of metal of which the tube is to be made to a form whose transverse section resembles the letter U, when this is performed by separate means unconnected with the rollers. But

What I claim as my invention and desire to secure by Letters Patent, is,

Arranging the rotary bur cutter I, between the preparatory U shaped die *a*, *b*, and the rollers G, G', substantially as herein described whereby the scarfing operation is performed at the same time as the forming operation and the forming machinery serves to hold and feed the strip or skelp in a suitable manner to receive the scarfing operation.

EDWIN ELLS.

Witnesses:
S. A. COTTER,
H. SKINNER.